July 27, 1971 R. V. POSNEY 3,595,636
APPARATUS FOR SHAPING AND COOLING GLASS SHEETS
Filed May 3, 1968 3 Sheets-Sheet 1

INVENTOR
RICHARD V. POSNEY

BY Chisholm and Spencer
ATTORNEYS

INVENTOR
RICHARD V. POSNEY
BY
ATTORNEYS

United States Patent Office 3,595,636
Patented July 27, 1971

---

3,595,636
APPARATUS FOR SHAPING AND COOLING GLASS SHEETS
Richard V. Posney, Freeport, Pa., assignor to PPG Industries, Inc., Pittsburgh, Pa.
Filed May 3, 1968, Ser. No. 726,331
Int. Cl. C03b 23/02
U.S. Cl. 65—287                                5 Claims

ABSTRACT OF THE DISCLOSURE

A mold for fabricating bent, tempered glass sheets having an apertured wall contoured to the shape desired for the bent glass enclosing a fluid supply chamber characterized by spaced, elongated, shallow grooves and a row of apertures extending from the floor of said grooves through the rear surface of the contoured wall to deliver fluid under pressure into the chamber and thence through said apertures and grooves toward an adjacent glass sheet surface in a diffused state.

---

Figure 1:
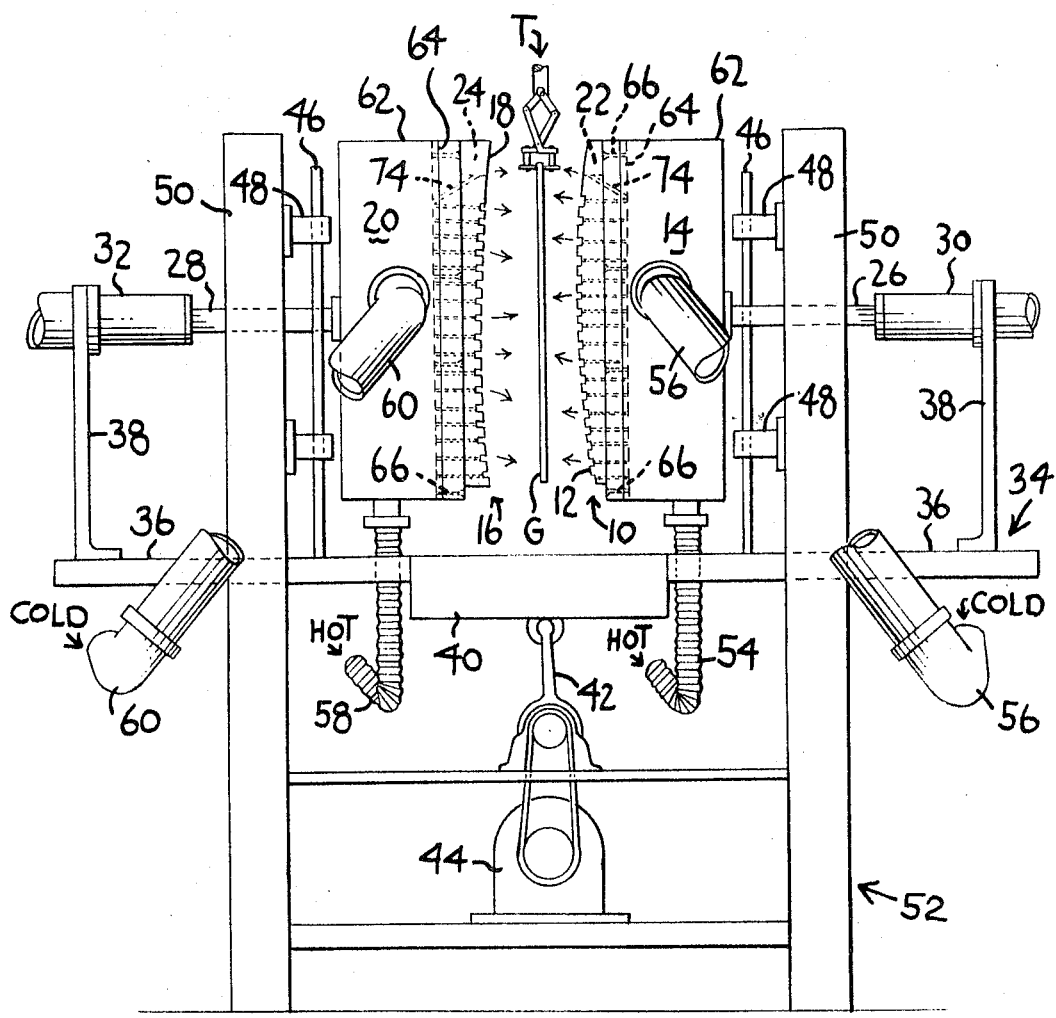

The present invention relates to treating glass sheets, particularly those that are shaped and cooled rapidly at a shaping station to impose at least a partial temper to the shaped glass sheets.

In a typical press bending and tempering operation, a series of glass sheets are conveyed through a tunnel-type furnace at a rate of speed that is correlated with the amount of heat supplied in the furnace to raise the temperature of each sheet of glass to its deformation temperature. When the leading sheet of glass in this series obtains the desired temperature, it leaves the furnace and enters a shaping station. There, the heat-softened glass is press bent to a desired curvature between complemental shaping surfaces formed on the outward facing surfaces of contoured walls of a pair of shaping molds. The walls of the pressing molds are apertured to permit fluid to be dispensed under pressure against the opposite surfaces of the bent glass sheet.

If it is desired to temper the bent sheets after they are shaped, the glass must be chilled rapidly before it cools to below the strain point. Preferably, the glass sheet is chilled immediately before it leaves the press bending station. This feature insures establishing a thermal gradient between the surfaces of the glass and its interior of sufficient steepness to impart a temper of the desired magnitude.

In recent years, increased numbers of curved glass sheets have been used as face plates for television tubes and as curved windows for automotive vehicles. The demand for these products has necessitated the development of mass production techniques to produce large quantities of curved glass sheets with a minimum of manual labor. The present invention provides a commercially practical mass production operation to make curved glass sheets having very close dimensional tolerances throughout their entire extent, and uniform curvature from sheet to sheet, characteristics needed to avoid breakage during mounting or in service and to insure acceptable optical properties in the fabricated products.

The present invention is especially suitable for press bending and thermally tempering relatively thin glass sheets, that is, those having thicknesses of less than $3/16$ inch. It is extremely critical to chill thin glass sheets immediately after they are shaped, because any delay in starting a rapid chilling of the glass reduces the maximum temper possible. Therefore, it is convenient, if not necessary, to chill the bent glass at the shaping station to avoid having the bent glass cool during its transfer from the shaping station to a cooling station. Thus, it is desirable to apply cold air blasts through all of the apertures in the pressing molds used to shape the heat-softened glass in order to reduce the time between the shaping operation and the rapid chilling to a bare minimum.

THE PRIOR ART

The use of apertured pressing molds in the glass bending and tempering art is not novel. U.S. Pat. No. 2,235,969 to White discloses solid concave and convex shaping molds that have elongated slots for supplying air under pressure toward the opposite surfaces of the bent glass sheet. Such elongated slots extend through the entire thickness of the mold. Since these molds are formed of a refractory material, the use of elongated slots extending throughout the entire depth of the shaped walls of the press bending molds for a considerable portion of the length of the molds makes the molds relatively fragile and likely to break.

Another prior art structure of apertured molds is shown in U.S. Pat. No. 3,279,906 to Baker. The molds of this latter patent are provided with nozzles of rounded cross section that extend obliquely downward through the shaping walls of the press bending molds. Since the apertures form a small portion of the shaping walls, the molds are less fragile than the earlier slotted molds. However, with small apertures, it is necessary to supply cold air blasts at a substantial pressure in order to cool the bent glass rapidly enough to impart a temper thereto. Strong spaced blasts from nozzles arranged in a checkerboard pattern produce a similar pattern of iridescent spots resulting from non-uniform chilling of the glass after it has been bent. Even when there is provision for relative movement between the bent glass and the mold immediately after shaping, the glass is still subject to iridescent patterns when chilled by air blasted through spaced, round nozzles.

The elongated slot configuration is superior to a checkerboard array of round nozzles when there is relative reciprocatory movement between the glass and the nozzles along an axis transverse to the length of the elongated slots. The iridescent pattern produced by applying a given volume of cold fluid per unit time through elongated slots is not objectionable because a layman cannot discern this pattern. However, the same volume applied at the same rate through an array of round apertures produces an irritating pattern that is easily visible to the naked eye at certain angles.

The present invention combines the best features of the elongated slot pattern with the best features of the checkerboard pattern of rounded apertures. The contoured walls of press bending molds conforming to the present invention have spaced shallow grooves provided with apertures that extend from the floor of the grooves to the chamber behind the contoured walls. The apertures are spaced along the length of each groove.

The axis of relative movement between the mold and the glass is transverse and preferably normal to the length of the grooves. Therefore, even though the fluid that is used to chill the heat-softened glass is applied through nozzles, the nozzles direct the fluid into elongated grooves that diffuse the fluid before the fluid blasts make contact with the adjacent surface of the heat-softened, press bent glass sheet.

Because of their novel recessed apertured structure, the apertured, contoured walls of molds conforming to the present invention are capable of providing a more uniform chilling over the entire bent glass surfaces than molds having rounded apertures that extend to the contoured shaping surface of the press bending molds. In addition, they are less fragile than molds slotted throughout their entire thickness.

The press bending molds are preferably made of a refractory material such as one having about 99 percent by weight of silica in a heat-resistant binder that is sold under the trade name of "Glassrock" or another sold under the trade name of "Masrock," or an asbestos cement board sold under the trade name of "Transite." Preferably, the refractory material of the foraminous contoured walls has a coefficient of heat conductivity between three and five British thermal units per hour per square foot of area per degree Fahrenheit difference per inch of thickness.

Figure 2:
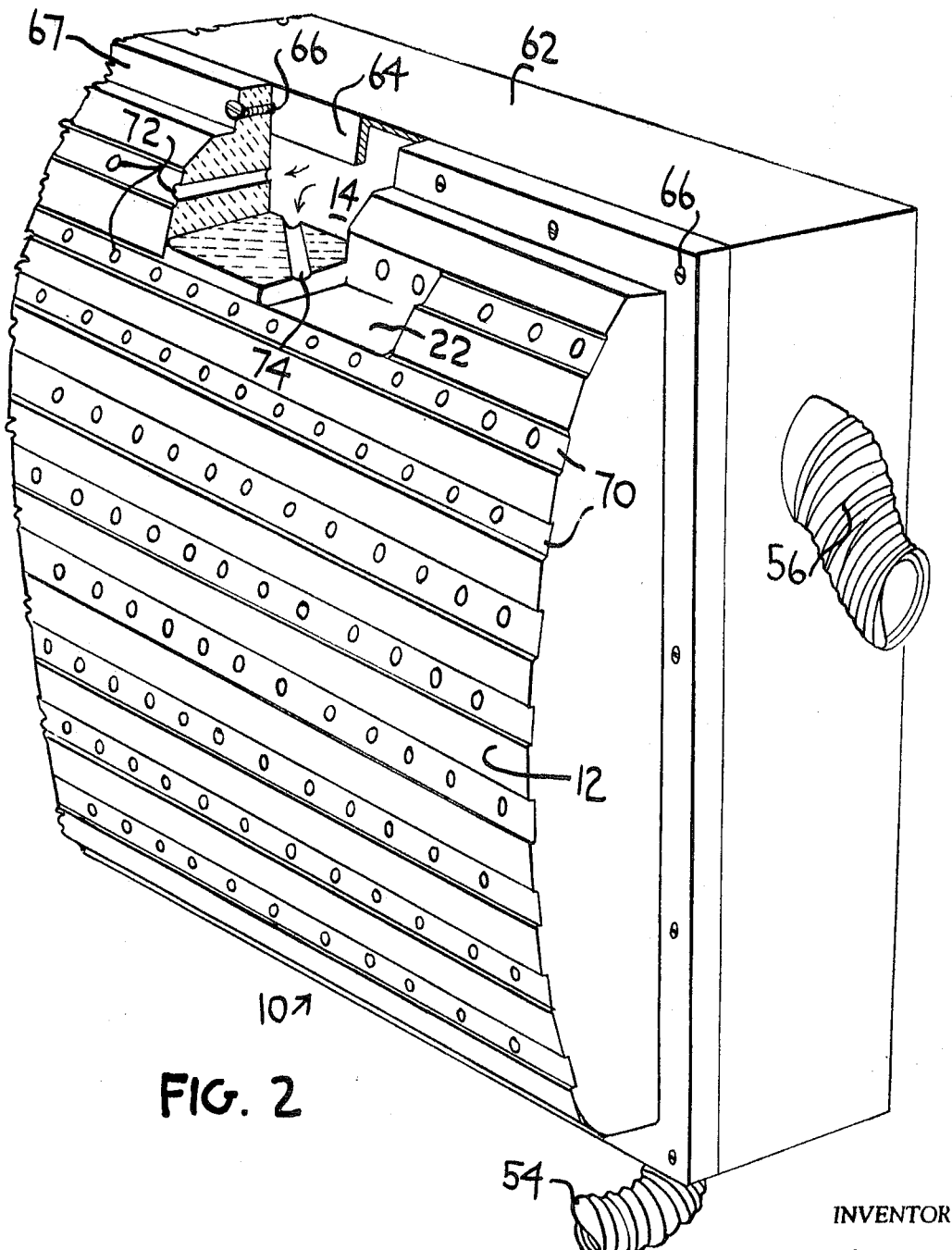
Figure 3:
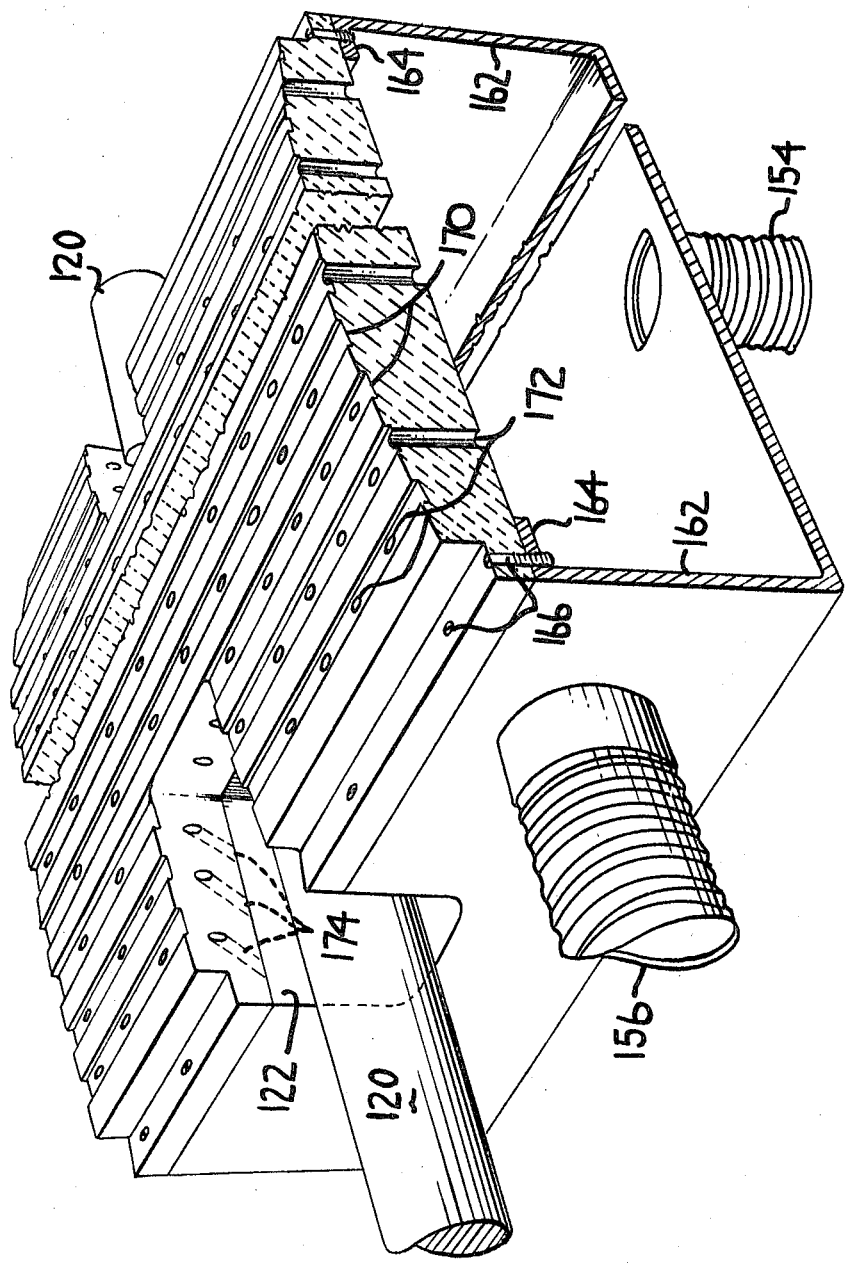

The present invention will be better understood after one reads a description of an illustrative embodiment of the present invention that follows. In the drawings which form part of the description, and wherein like reference numerals refer to like structural elements, FIG. 1 is a schematic end elevational view with certain parts removed illustrating one embodiment of the present invention adapted for vertical press bending;

FIG. 2 is a fragmentary, enlarged, perspective view of a portion of the pressing mold depicted in FIG. 1, with certain portions cut away to improve the illustration; and FIG. 3 is a fragmentary view similar to that of FIG. 2 showing a portion of a pressing mold used for pressing horizontally disposed glass sheets.

Referring to the drawings, FIG. 1 shows a vertical press bending apparatus conforming to the present invention. In the vertical press bending operation, a glass sheet G is usually suspended from self-closing, scissor-type tongs T. The latter are suspended from an overhead carriage (not shown) driven by an overhead conveyor (not shown) such as is conventional in the glass sheet treatment art.

The vertical press bending apparatus of FIG. 1 comprises a convex mold 10 having an apertured contoured wall 12 of convex configuration disposed at the outwardly facing surface of a single chamber 14. The convex mold is disposed to one side of a vertical plane intersecting a path along which glass sheets G are transported while suspended from the tongs T during a press bending and cooling operation.

A concave mold 16 having a contoured wall 18 of concave configuration, which is also apertured and which encloses the inner side of a single chamber 20, is disposed to the other side of the vertical plane intersecting the path taken by the glass sheets G suspended from tongs T. Mold 10 has a notch or recess 22 and mold 16 has a notch or recess 24. The notches or recesses are located along the edges of the respective shaping surfaces to oppose one another. The notches or recesses are formed by walls of a size and shape sufficient to provide clearance for the tongs T when the glass sheet G is engaged between the opposite shaping surfaces formed on the inwardly facing surfaces of the contoured walls 12 and 18 of the respective molds 10 and 16.

Mold 10 moves in response to movement of an actuating piston 26 while mold 16 moves in response to movement of an actuating piston 28 in a manner well known in the art. Piston 26 moves within a piston housing 30 whereas piston 28 moves within a piston housing 32. The piston housings are supported together with the molds on a mold support frame 34.

The support frame 34 comprises a horizontal platform 36 having a plurality of uprights 38 extending upward from the platform to support the piston housings 30 and 32. The platform 36 comprises a centrally disposed bracket 40 linked to a cam 42. The latter is driven by a motor 44. A pair of vertical guide rods 46 extend upward from the platform 36 through sleeve guides 48. The latter connect to vertical pillars 50 of a supporting framework 52 that carries the motor 44 and the cam 42. When the motor 44 drives the cam 42, platform 36 and the molds 10 and 16 reciprocate along a vertical axis, Flexible hot gas supply pipes 54 and flexible cold air supply pipes 56 are connected to chamber 14 to supply hot gas or cold air, respectively, to the chamber 14 under pressure from suitable sources (not shown). Additional flexible hot gas supply pipes 58 and additional flexible cold air supply pipes 60 are connected to chamber 20 to furnish hot gas and cold air, respectively, to chamber 20 of the concave mold 16, also under pressure. The supply of hot fluid and cold fluid to the various fluid supply pipes is programed in a manner described and claimed in U.S. Pat. No. 3,529,947 of Rober G. Frank, assigned to PPG Industries, Inc. Suitable controls program the supply of fluid through the flexible hot gas supply pipes 54 and 58 to chambers 14 and 20 and the flow of cold fluid through the cold air supply pipes 56 and 60 to both chambers according to a program depicted in the aforesaid patent application of Robert G. Frank, the description of which is incorporated herein by reference.

In order to attach the chamber 14 to the outer contoured wall 12 of the convex mold 10, the chamber is provided with metal walls 62 enclosing the rear wall, the upper and lower walls and the side walls of the chamber 14. A peripheral metal flange 64 extends from the front end of the upper, lower and side walls of the chamber 14. A series of screws 66 attach the metal flange 64 of the walls of the chamber 14 to a recessed perimeter 67 of the contoured wall 12 of the convex mold 10. Similar construction is provided for connecting the metal walls of the chamber 20 to the concave wall 18 of the concave mold 16.

The outer faces of the contoured walls of each of the molds are shaped to conform to the curvature desired for the glass sheet generally, except for a series of spaced, elongated, shallow grooves 70. The latter are preferably parallel, extend horizontally and are equally spaced from one another.

Each of the grooves is provided with a series of apertures 72 that extend from the floor of the grooves through the entire thickness of the wall 12 or 18 to provide a passage extending to the groove 70 from the chamber 14 or 20. In a particular embodiment of the present invention that has been found suitable for bending and tempering glass sheets of ⅛ inch nominal thickness, the elongated slots 70 are 3/16 inches wide and 1/16 inch deep and spaced from one another at one-half inch centers. The apertures 72 that extend completely through the thickness of the shaping wall of ceramic material are of circular cross-section of ⅛ inch diameter and spaced from adjacent apertures at ½ inch centers.

The clearance notches 22 and 24, are designed to receive the tongs T when the pressing molds 10 and 12 engage the opposite surfaces of the glass sheet G during bending. In a typical apparatus, the clearance notches for the tongs are one and one-half inches wide, one and one-half inches high, and one inch deep. The thickness of the ceramic shaping walls 12 and 18 is between one and one-half and two inches. The molds are arranged so that when a glass sheet is aligned therebetween for press bending, the molds form frames approximately one inch wide beyond the entire peripheral margin of the glass sheet to be processed.

The side walls of each notch are pierced with oblique apertures 74 extending in horizontal planes between the horizontal grooves 70. The oblique apertures 74 are of 3/16 inch diameter and set at an angle of 20 to 30 degrees with respect to the front face of the mold. In addition, the rear vertical walls of the notches are provided with additional horizontal apertures 72 which are parallel to the apertures in the grooves 70 and are aligned therewith. The additional apertures through the walls of the slot furnish fluid to the glass portions facing the slots and the tongs gripping the glass.

The apertures 72 are preferably equally spaced along each of the grooves 70. Apertures of adjacent grooves are offset from one another so that lines interconnecting apertures 72 of adjacent grooves 70 extend at an oblique angle (preferably about 15 degrees) to lines extending normal to the length of the grooves 70.

The eccentric cam 42 is preferably adjusted to provide a stroke ⅝ inch long for the molds which move with a to-and-fro motion in a vertical direction relative to the glass sheet G.

In a typical operation, when a glass sheet G is heated to its deformation temperature, it is moved to a position between a pair of retracted molds 10 and 16. The molds are then moved inward towards one another and shape the heat-softened glass to the desired curvature. Immediately, the molds are retracted a short distance and cold air is supplied through the flexible cold air supply pipes 56 and 60 to chambers 14 and 20 at a rate sufficient to impart cold air blasts under pressure through all of the apertures 72 and 74 into the narrow elongated grooves 70, which diffuse the air blasts. At the same time, the molds are reciprocated vertically to cause the diffused air to be applied substantially uniformly over the glass surface to chill the glass rapidly and substantially uniformly over its entire surface. The bent glass sheet G is thus tempered substantially uniformly throughout its entire extent and a minimum of iridescent pattern appears in the bent glass.

Several experiments were performed to determine optimum parameters for rapidly chilling pressed glass sheets. In these experiments, the apertures 72 were arranged in rows ½ inch apart. The apertures in each row were ⅛ inch diameter spaced ½ inch apart center to center and the rows were skewed at a fifteen degree angle to the axis of relative movement between the glass sheet and the press bending mold. The apertures were recessed in elongated slots ³⁄₁₆ inch wide and ¹⁄₁₆ inch deep extending horizontally along the length of the pressing molds.

The following parameters listed in Table I were verified as the minimum quenching times and minimum displacement at 60 cycles of reciprocation per minute to establish an acceptable temper in a glass sheet previously heated to 1220 degrees Fahrenheit before being press bent and quenched. An acceptable temper is considered one in which the glass develops a surface compression stress of at least 20,000 pounds per square inch.

TABLE I

| Type of glass | Nominal thickness, inch | Mold to mold separation, inch | Minimum acceptable displacement, inch | Minimum time to produce acceptable temper, seconds |
|---|---|---|---|---|
| Sheet | ⅛ | .45 | ⅝ | 5 |
| Do | ³⁄₁₆ | .55 | ⅝ | 7 |
| Plate | ¼ | .65 | ⅝ | 9 |

Previous work on glass tempering had indicated that commercial soda-lime-silica compositions of sheet glass, plate glass and float glass had insignificant differences from one another in parameters for identical thicknesses, heating cycles, nozzle or aperture configurations, mold to mold separation during rapid chilling, rate of cold air flow and displacement during relative oscillation between the bent glass and the apertured molds during quenching.

It has previously been determined that the molds should be within an optimum temperature range when they contact the glass sheet during the onset of a press bending operation. This temperature range for the mold materials used for the shaping walls of the molds has been determined to be between 600 degrees Fahrenheit and 750 degrees Fahrenheit, as disclosed in U.S. patent application Ser. No. 699,131 of George W. Stilley and Joseph D. Kelly, filed Jan. 19, 1968 and assigned to PPG Industries, Inc.

In order to insure that the molds are at a proper temperature, heated gas is supplied to the mold chambers through the hot gas supply pipes 54 and 58 between shaping operations. In addition, when the glass is bent to a very sharp curvature, it may be necessary to supply hot gas through the apertures 70 of the convex shaping mold 10 in order to help assist remove the bent glass from its embrace with the convex shaping mold 10. It is understood that optimum employment of the present invention will make suitable use of these suggestions.

While the present invention has been described in connection with molds for press bending and tempering glass sheets that are processed while suspended between self closing, scissor-type tongs, the principles of the present invention are equally applicable to glass treatments in which the glass is supported in any plane by any solid, liquid or gaseous support or combination of such supports. A typical example is a horizontal press bending operation in which the flat glass is supported in a horizontal position and conveyed by conveying elements such as spaced horizontal rollers or other motion imparting elements while the glass is supported in a horizontal or near horizontal position for movement into and out of a press bending station comprising a pair of shaping molds disposed above and below the plane of support for the glass sheets.

A typical construction of a typical convex mold 110 for a horizontal press bending operation using a roller conveyor comprising stub rolls 120 at the shaping station, as described and claimed in U.S. Pat. No. 3,374,080 to Robert W. Wheeler, and assigned to PPG Industries, Inc., is shown in FIG. 3. In this mold structure, a notch or recess 122, preferably 8 inches long, 2 inches wide and 1½ inches high formed of walls of corresponding dimensions, is provided along the edge of the mold shaping surface to provide clearance for each drive stub roll 120 at the shaping station. The grooves 170 are ¹⁄₁₆ inch deep by ³⁄₁₆ inch wide and separated from one another by ½ inch center to center. The grooves extend parallel to one another with their length normal to the axis of the stub rolls 120. Each of the grooves 170 contains apertures 172 of uniform cross-section ⅛ inch in diameter and uniformly spaced ½ inch on centers along the length of the slot 170. Apertures of adjacent grooves are offset obliquely from one another to provide lines extending obliquely (preferably about 15 degrees) to an axis normal to the direction of glass sheet movement into and out of the shaping station.

Oblique apertures 174 communicating with each notch 122 are ³⁄₁₆ inch in diameter and are inclined between 20 and 30 degrees to a plane normal to the glass surface. The molds for pressing horizontally disposed glass sheets are also of sufficient size to provide a frame one inch wide all around the margin of the glass sheet to be processed. For example, a pressing mold for press bending glass sheets 16 inches wide by 22 inches long has external dimensions 18 inches wide by 24 inches long with the exception of the notched out areas for receiving the stub rolls.

The horizontal pressing apparatus comprises an upper pressing mold having a downwardly facing apertured wall contoured to a shape complemental to that of the upward facing wall of the mold 110. The apertures are recessed in both molds to enable both surfaces of the bent sheet to be sprayed uniformly with diffused fluid. Means is included to impart a to-and-fro motion to the bent glass when the molds are retracted and cold fluid imparted through the apertures 172 and 174 and diffused through the elongated grooves 170. A typical apparatus for imparting such motion is depicted in U.S. patent application Ser. No. 711,946 of Robert G. Frank, filed Mar. 11, 1968 and assigned to PPG Industries, Inc.

The form of the invention shown and described in this disclosure represents certain illustrative embodiments thereof. It is understood that various changes may be made without departing from the spirit of the invention as defined in the following subject matter which follows.

What is claimed is:

1. An apparatus for shaping and cooling glass sheets comprising a shaping member having an outer shaping surface of a contour conforming generally to that desired for a shaped glass sheet, means for supporting a glass sheet in a position so that said glass sheet is closely adjacent to said shaping surface of said shaping member, said shaping member having apertures extending therethrough from said shaping surface, and a chamber for receiving a fluid under pressure mounted on said shaping member in a position so as to discharge said fluid through said apertures and to direct said fluid against the surface of said glass sheet adjacent said glass sheet, said shaping member having at least one recess extending inwardly from said shaping surface, said recess having walls and being of a size and shape sufficient to receive a portion of said glass-supporting means adjacent thereto, each of said recesses being located in an edge of said shaping surface, said shaping member having apertures extending therethrough from at least one wall of each recess to said chamber for receiving fluid under pressure so as to discharge and direct said fluid against the portion of said glass sheet supporting means disposed therein.

2. An apparatus as in claim 1, characterized by spaced, elongated shallow grooves having a depth less than the thickness of said shaping member and wherein said apertures extending through said member are arranged as a row of apertures for each of said grooves, said apertures of each row extending from the floor of said groove containing said row of apertures through said shaping member to said chamber for receiving fluid under pressure.

3. A mold as in claim 2, wherein said grooves are substantially parallel to one another and substantially equi-distant from one another.

4. A mold as in claim 3, further including means to provide relative to-and-fro movement between said glass sheet and said mold along an axis of relative movement transverse to the length of said grooves.

5. A mold as in claim 4, wherein said apertures in said row for each groove are substantially equi-distant from adjacent apertures in said row and offset from apertures in adjacent grooves to form diagonal rows of apertures extending obliquely of said grooves.

References Cited

UNITED STATES PATENTS 1,622,817   3/1927   Waldron _____ 65—182X

FOREIGN PATENTS 1,158,738   1/1958   France _____ 65—106

ARTHUR D. KELLOGG, Primary Examiner

U.S. Cl. X.R.

65—182, 273, 275, 348

PO-1050
(5/69)

UNITED STATES PATENT OFFICE
CERTIFICATE OF CORRECTION

Patent No. 3,595,636          Dated July 27, 1971

Inventor(s) Richard V. Posney

It is certified that error appears in the above-identified patent and that said Letters Patent are hereby corrected as shown below:

Column 7, line 6, please insert after "glass sheet adjacent said", --shaping surface and the apertures therein opposed to said--

Signed and sealed this 4th day of January 1972.

(SEAL)
Attest:

EDWARD M. FLETCHER, JR.      ROBERT GOTTSCHALK
Attesting Officer              Acting Commissioner of Patents